Feb. 27, 1962  E. H. BOWERS ETAL  3,023,058
ROTATING AXIAL THRUST BEARINGS
Filed June 29, 1959

INVENTORS
ERIC HIDER BOWERS
OSWALD THOMA
BY
Reynolds, Beach & Christensen
ATTORNEYS

United States Patent Office

3,023,058
Patented Feb. 27, 1962

3,023,058
ROTATING AXIAL THRUST BEARINGS
Eric H. Bowers and Oswald Thoma, Cheltenham, England, assignors, by direct and mesne assignments, to Dowty Hydraulic Units Limited, Ashchurch, Tewkesbury, England, a British company, and Unipat A.G., Glarus, Switzerland, a Swiss corporation, jointly
Filed June 29, 1959, Ser. No. 823,547
2 Claims. (Cl. 308—231)

This invention relates to rotating axial thrust bearings comprising complemental fixed and rotating bearing members having flat annular bearing surfaces and a set of short cylindrical rollers located in a cage between the two surfaces so that the rollers are held in the radial position having regard to the axis of rotation. It is usual in bearings of this kind to arrange that the bearing members are rigidly constructed, as for example, by making them quite thick, with the intention that under the axial thrust for which they are designed there will be substantially no elastic distortion of these members, thus intendedly ensuring that the bearing surfaces remain substantially flat and parallel and that there is a substantially even distribution of thrust between the rollers. Also it is usual for the fixed bearing member to be located in position by a spherical seating which allows automatic adjustment so that the fixed and the rotative bearing surfaces always remain parallel. However, such a bearing having rigid bearing members and a spherical seating for the fixed bearing member has a number of disadvantages in practice as follows:

(a) Since with ordinary machining techniques it is impossible to machine the bearing surface of the rotating bearing member so that its axis is not slightly inclined to the axis of rotation, operation of the bearing will result in a continuous slight oscillation or swash movement of the fixed bearing member on its spherical seat, thus giving rise to scuffing corrosion at the spherical seat.

(b) However rigidly the bearing members are made it is still likely that some elastic movement of these bearing members under axial thrust will occur, which will tend to give unequal distribution of thrust between the radially inner and outer zones of the bearing.

(c) In making the bearing members of rigid construction, hence thick, collectively with the rollers they must extend to a considerable extent in the direction of the axis of rotation and require considerable space to accommodate the bearing as a whole.

It is the main object of this invention to provide a simple rotating axial thrust bearing having a spherical seating for the fixed bearing member and a rotative seating for the rotative bearing member—one of which seatings is radially displaced relative to the other—whereby despite deformation under thrust loads between the radially displaced seatings substantially even distribution of thrust among the several rollers and lengthwise of each thereof, during operation, and is allowed substantially reduced scuffing corrosion occurs at the spherical seating. A further object of this invention is to reduce the axial length of the rotating thrust bearing, accepting and compensating for expected deformation in the resultant thin bearing discs.

In accordance with the present invention, in a rotating axial thrust bearing the thickness of each bearing member is small compared with its outer diameter, one bearing member is arranged so that thrust is applied at a seating adjacent to the inner diameter of its bearing surface, the other bearing member is arranged so that thrust is applied at a seating adjacent to the outer diameter of its bearing surface, and the elastic characteristics of each bearing member are such that when thrust is applied to the bearing the elastic distortion of each bearing member causes each bearing surface to assume substantially similar shallow conical shapes which remain equidistantly spaced in the direction of the rotation axis at all points to distribute thrust substantially equally between the rollers, the fixed bearing member having its thrust applied through a spherical seating to allow it to settle as closely as possible to the position where the axis of such bearing member coincides with the axis of rotation. From this invention it will be seen that the bearing surfaces can remain equidistantly spaced in spite of elastic distortion resulting from applied axial thrust and that where the rotating bearing member is inaccurately set to a slight extent in that its axis is inclined to the rotation axis the elastic characteristics of the bearing members permit of cyclic elastic distortion which reduces swash movement and scuffing at the spherical seating. To obtain full benefit from the invention it is desirable that the rotating bearing member should be arranged during manufacture so that its bearing surface is as nearly coaxial as possible with the rotation axis. The fixed bearing member will then settle on the spherical seating to lie substantially with its bearing surface coaxial with the rotation axis and swash movement resulting from slight errors in the setting of the rotating bearing member will be elastically absorbed in both bearing members, maintaining a substantially even thrust distribution through the rollers and substantially avoiding scuffing at the spherical seating.

It has been previously proposed to use a spherical seating for a bearing member in a rotating axial thrust bearing of the kind referred to in which the bearing members are of rigid construction, but the purpose of such a spherical seating is then to permit of cyclic scuffing movements of one bearing member on the spherical seating resulting from the relative rotation of the other bearing member, and in the course of time the seating corrodes as a result of constant scuffing. In the bearing construction of the present invention scuffing of this nature takes place only to a very small extent.

Where the invention is applied in absorbing axial thrust from a shaft rotating in a fixed housing the shaft rotating in a fixed housing the shaft transfers thrust to the rotating bearing member at its inner diameter while the other bearing member is supported at its outer diameter on a spherical seating.

In order to explain the invention more clearly one example thereof will be described with reference to the accompanying drawings, in which.

Figure 1:
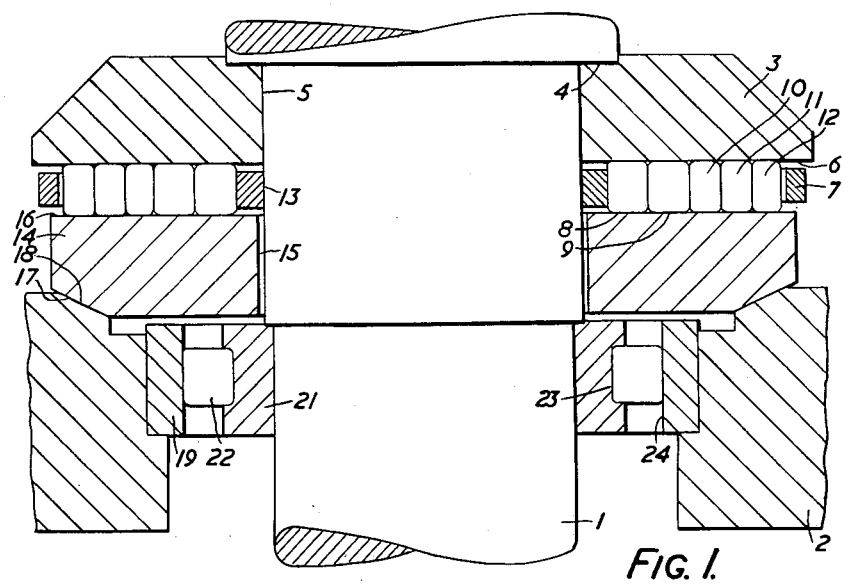
FIGURE 1 is a sectional view through the bearing in the unloaded state.

The bearing is intended to support a rotating shaft 1 in a fixed housing 2 to resist an axial thrust such as will act in the downward direction as seen in the drawings. A rotating axial thrust bearing member 3 is carried by the shaft 1 and thrust is transferred from the shaft to the member 3 by a shoulder 4 which engages adjacent to the internal diameter of bearing member 3. This bearing member is in the form of a flat disc whose thickness is small compared with its outer diameter and which includes a central hole 5 which is a close fit upon shaft 1, with which it rotates. The surface 6 of the member 3 opposite to shoulder 4 forms the bearing surface and is machined during manufacture so that as far as possible it is flat and perpendicular to the rotation axis of shaft 1. The roller assembly which engages surface 6 comprises cage 7 in the form of a plate of brass or other suitable material having a plurality of radially directed slots each of which houses a number of cylindrical rollers, of which five are shown, designated 8, 9, 10, 11 and 12, all of the same diameter. The cage 7 has a central hole 13 which fits accurately on shaft 1 so that the rollers are always located in a truly radial position having regard to the axis of rotation. The other axial thrust bearing member 14 is also in the form of a flat disc and has a central hole 15 larger in diameter than the shaft 1 so as to clear the latter. The upper bearing surface 16 of member 14 is flat and engages the rollers. At the outer edge of member 14 opposite to the outer edge of surface 6 a spherical seating 17 is formed which engages a generally complemental spherical seating 18 formed on the fixed housing 2. The centre of curvature of these two seatings lies on the axis of rotation of shaft 1 a considerable distance above the bearing in the drawing. The radial thrust bearing is located between shaft 1 and housing 2 and comprises an outer race 19 engaged in the housing 2, and an inner race 21 engaged on shaft 1 and rollers 22 located between the two races. These rollers run in a groove 23 formed in the inner race and engage the cylindrical surface 24 formed in the outer race 19. The only characteristic of this radial thrust bearing that requires mention is that its rollers 22 be permitted to shift in the direction of the rotation axis relative to one race, 19, when the other race, 21, is shifted by axial loads.

The two bearing members 3 and 14 are both made of hardened steel having the same elastic properties and it will be seen from the drawings that they are almost of the same dimensions. However, they will not be of exactly the same dimensions due to the fact that member 3 has the thrust applied at its inner diameter and member 14 has the thrust applied at its outer diameter and to carry out the invention these thrusts must produce similar elastic distortions of the two bearing members. To this end member 3 is of slightly larger radius than member 14.

Figure 2:
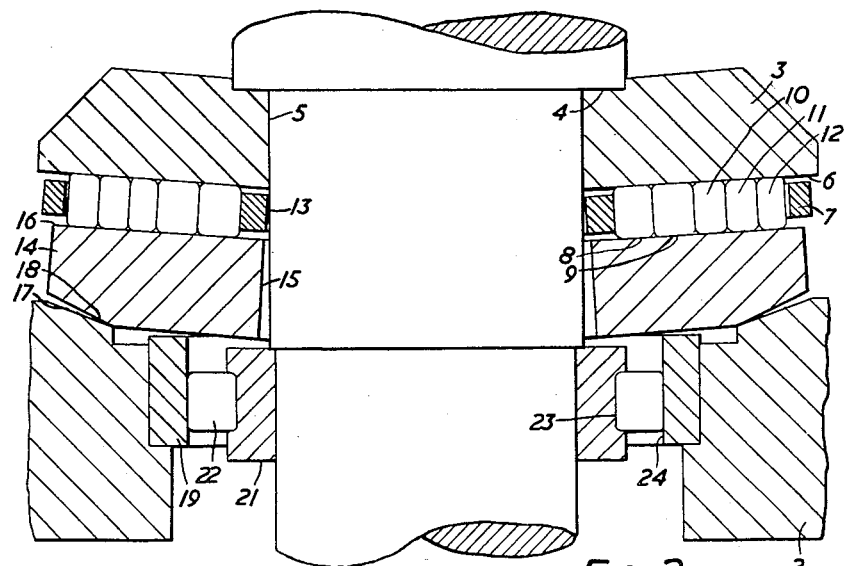
FIGURE 2 is a sectional view similar to FIGURE 1 illustrating in an exaggerated manner the distortions which take place when the bearing is loaded with an axial thrust.

FIGURE 2 shows in a greatly exaggerated manner the elastic distortions of the two bearing members 3 and 14 when the axial thrust is applied on shaft 1 in a downward direction. Both of the bearing members 3 and 14, upon distortion, tend to assume similar flat conical shapes with the result that the bearing surfaces 6 and 16 still remain equidistantly spaced at all points, thus ensuring equal distribution of load between the rollers. The spherical seatings 17 and 18 will allow bearing member 14 under no-load conditions to assume a position where it lies substantially so that its axis coincides with the rotation axis of the shaft 1. Where the bearing surface 6 of bearing member 3 is not accurately perpendicular to the rotation axis of shaft 1 within the tolerances of ordinary machining techniques a cyclic movement synchronous with shaft rotation will be applied to the bearing member 14 tending to move it cyclically on its spherical seating. However, due to the elasticity of the two bearing members and the frictional engagement between the spherical seatings, under axial thrust load the bearing member 14 will not move to any extent on the spherical seating, but the cyclic variation will be substantially absorbed by the elasticity of the bearing members 3 and 14 themselves. Thus, by making the members 3 and 14 alike, and equally distortable, thereby ensuring that there is substantially no cyclic movement of member 14 on the spherical seatings, it will be seen that corrosion or wear due to scuffing at the spherical seating takes place at a very low rate. At the same time the spherical seating does carry out the function of allowing the bearing member 14 to settle so that its bearing surface 16 lies exactly perpendicular to the axis of rotation. It is also possible while the shaft is rotating that it will change its position slightly by elastic distortion of radial thrust bearings such as the bearing 19, 21, 22 and its working clearance. Such deflections will be accommodated for the most part by the axial thrust bearing by elastic distortion of the bearing members 3, 14 themselves.

While the described example has shown a rotating bearing member fixedly secured to a rotating shaft with the fixed bearing member adjustably mounted on a spherical seat it will be seen that it is equally within the scope of the present invention to mount the rotating bearing member on a rotating shaft or the like by means of a spherical seat and to mount the non-rotating bearing member fixedly in a housing so that its bearing surface is substantially perpendicular to the rotation axis.

We claim as our invention:

1. A rotating axial thrust bearing comprising a bearing member having a flat bearing surface, and an opposite spherical seating surface, a complemental spherical seating to locate said bearing member in position, a complemental bearing member also having a flat bearing surface, a seating for the complemental bearing member, one of said bearing members and its seating being rotative and the other non-rotative, bearing elements including a plurality of short cylindrical rollers radially disposed and circumferentially spaced between the two bearing surfaces to locate the rollers equally in contact with both bearing surfaces, under no-load conditions, with their rolling axes disposed radially with respect of the axis of rotation, the bearing members each having small thickness compared with their diameters, and being chosen of a material such that each is similarly elastically deformable under axial thrust load, the rotative and the non-rotative seatings acting one on the inner and the other on the outer diameters of their respective bearing members to ensure that the elastic deformations of the bearing members under axial thrust are complementary to the extent that the normally flat bearing surfaces assume shallow conical shapes which are equidistantly spaced to distribute thrust evenly through the rollers, the spherical seating of the one bearing member serving to allow it to settle co-axially with the axis of rotation whilst the elasticity of the bearing members substantially prevents swash movement of the fixed bearing member on the spherical seating.

2. A rotating axial thrust bearing as claimed in claim 1 for use with a shaft rotating in a housing, wherein the rotative bearing member is fixed securely to the shaft by means of the rotative seating at the inner diameter of the bearing member and the fixed bearing member is located on the spherical seating at its outer diameter in the housing.

References Cited in the file of this patent

UNITED STATES PATENTS

| 2,374,820 | Kaye | May 1, 1945 |
| 2,584,652 | Ablett | Feb. 5, 1952 |

FOREIGN PATENTS

| 50,830 | Sweden | Apr. 8, 1919 |
| 499,180 | Great Britain | Jan. 19, 1939 |